(12) United States Patent
Mun et al.

(10) Patent No.: US 7,155,211 B2
(45) Date of Patent: Dec. 26, 2006

(54) METHOD AND SYSTEM FOR PROVIDING A PICTURE AS CALLER IDENTIFICATION

(75) Inventors: Hyun-Jung Mun, Songnam-shi (KR);
Kyou-Woong Kim, Suwon-shi (KR);
Young-Hoon Cheong, Seoul (KR);
Sung-Eun Lee, Puchon-shi (KR)

(73) Assignee: Samsung Electronics Co., Ltd. (KR)

( * ) Notice: Subject to any disclaimer, the term of this patent is extended or adjusted under 35 U.S.C. 154(b) by 377 days.

(21) Appl. No.: 10/190,789

(22) Filed: Jul. 8, 2002

(65) Prior Publication Data
US 2003/0022659 A1    Jan. 30, 2003

(30) Foreign Application Priority Data
Jul. 27, 2001    (KR)    ............ 10-2001-45451

(51) Int. Cl.
*H04M 3/42*    (2006.01)
(52) U.S. Cl. ............ 455/415; 370/328; 379/88.21; 455/509
(58) Field of Classification Search ............ 455/415
See application file for complete search history.

(56) References Cited
U.S. PATENT DOCUMENTS
5,428,665 A * 6/1995 Lantto ............ 455/414.1
6,052,600 A * 4/2000 Fette et al. ............ 455/509
2003/0032413 A1 * 2/2003 Aksu et al. ............ 455/415

FOREIGN PATENT DOCUMENTS
CN    1291018    4/2001
EP    1 069 789 A1 *    1/2001

* cited by examiner

*Primary Examiner*—Gerald Gauthier
(74) *Attorney, Agent, or Firm*—The Farrell Law Firm (57) ABSTRACT

A method and system for providing a picture as caller ID (Identification). In a mobile communication system having a first mobile station (MS) on a calling side, a second MS on a called side, and a base station (BS) and an MSC that enable communication between the first and second MSs, the MSC has a storage component that stores picture information of each MS. The MSC receives a SETUP message from the first MS via the BS during a call attempt by the first MS, checks whether the picture information of the first MS is stored in the storage component in response to the SETUP message, and transmits the picture information of the first MS to the second MS so that the picture information of the first MS can be displayed as the caller ID on a display of the second MS, if the picture information of the first MS is stored in the storage component of the MSC.

10 Claims, 8 Drawing Sheets

| NO | CID | PCID |
|---|---|---|
| 1 | 011-123-4567 | PCID 1 |
| 2 | 016-234-5678 | PCID 2 |
| 3 | 017-345-6789 | PCID 3 |
| 4 | 018-456-7890 | PCID 4 |
| ... | ... | ... |
| N | 019-567-8907 | PCID N |

METHOD AND SYSTEM FOR PROVIDING A PICTURE AS CALLER IDENTIFICATION

PRIORITY

This application claims priority to an application entitled "Method and System for Providing Picture as Caller Identification Information" filed in the Korean Industrial Property Office on Jul. 27, 2001 and assigned Ser. No. 2001-45451, the contents of which are hereby incorporated by reference.

BACKGROUND OF THE INVENTION

1. Field of the Invention

The present invention relates generally to a communication system, and in particular, to a method and system for providing caller ID (Identification) to a called telephone.

2. Description of the Related Art

A typical communication system offers only voice call service to subscribers. The efforts of service providers to provide better service to subscribers coupled with the rapid development of wired and wireless communication technology have encouraged various additional services to be deployed. A major example of the additional services is caller ID service that is currently being provided. The caller ID service informs a called party of the caller's identity before answering the incoming call.

The caller ID service, however, provides only the phone number of the caller, which is not always enough for the called party to identify the caller.

SUMMARY OF THE INVENTION

It is, therefore, an object of the present invention to provide a method and system for providing more specific caller ID information to a called party to better identify the caller.

The above and other objects are achieved by providing a method and system for providing a picture as caller ID. In a mobile communication system having a first mobile station (MS) on a calling side, a second MS on a called side, and a base station (BS) and a Mobile Switching Center (MSC) that enable communication between the first and second MSs, the MSC has a storage component that stores picture information of each MS. The MSC receives a SETUP message from the first MS via the BS during a call attempt by the first MS, checks whether the picture information of the first MS is stored in the storage component in response to the SETUP message, and transmits the picture information of the first MS to the second MS so that the picture information of the first MS can be displayed as caller ID on a display of the second MS, if the picture information of the first MS is stored in the MSC.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Since existing mobile communication services are conducted with voice and characters, the available caller ID is merely a caller's phone number. However, once the 2.5 generation or the third generation mobile communication services are deployed, picture services and terminals supporting the picture services will become widespread. In this context, the present invention provides an improved caller ID service that allows a called party to view a preliminarily registered picture of a caller before answering an incoming call. This improved caller ID service is applicable to a mobile communication system over a mobile communication network as well as a wired communication system over the PSTN (Public Switched Telephone Network). However, a description will be made herein below of the caller ID service according to the present invention in the context of a mobile communication system.

Figure 1:
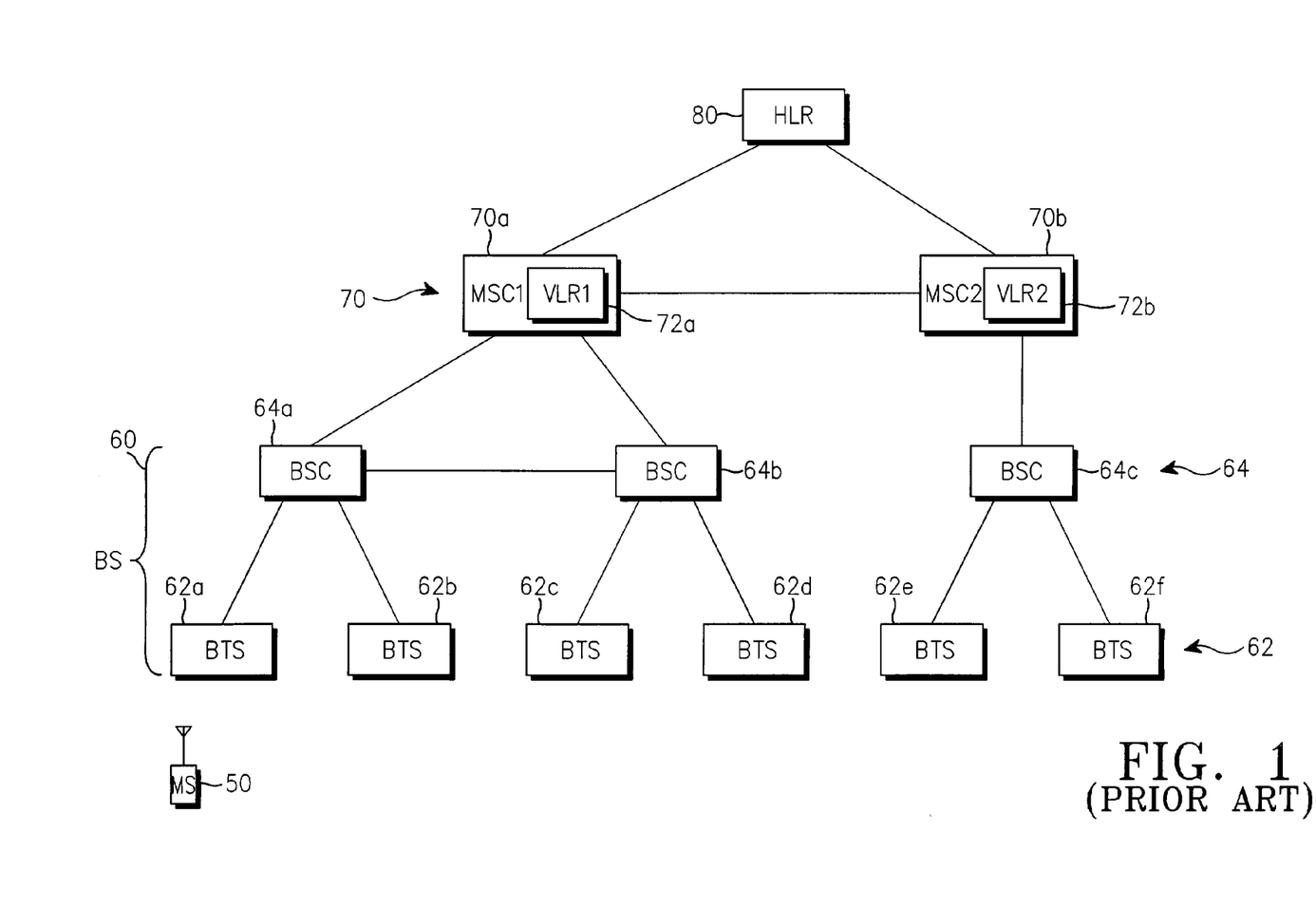
FIG. 1 illustrates a typical mobile communication system configuration.

FIG. 1 illustrates a typical mobile communication network configuration to which the present invention is applied. Such mobile communication systems include CDMA2000 (Code Division Multiple Access 2000), UMTS (Universal Mobile Telecommunication System), and PCS (Personal Communication System).

Referring to FIG. 1, the conventional mobile communication system includes a home location register (HLR) 80, mobile switching centers (MSCs) 70, base station controllers (BSCs) 64, base station transceiver subsystems (BTSs) 62, and a mobile station (MS) 50. In a mobile communication system, HLRs interact with MSCs to perform subscriber management and call switching. The HLR 80 is connected to a plurality of MSCs 70 (i.e. MSC1 70a and MSC2 70b). Each MSC 70 is connected to a plurality of BSCs 64 (64a, 64b and 64c). The MSC 70a is connected to the BSCs 64a and 64b and the MSC 70b, is connected to the BSC 64c. Each BSC 64 is connected to a plurality of BTSs 62 (62a to 62f). The BSC 64a is connected to the BTSs 62a and 62b, the BSC 64b is connected to the BTSs 62c and 62d, and the BSC 64c is connected to the BTSs 62e and 62f. BSCs and BTSs are collectively termed BSs (Base Stations) 60.

The MSCs 70 control connection to the BSCs 64, the PSTN and the PLMN (Public Land Mobile Network). The BSCs 64 control the radio links, and handoffs. The BTSs 62 establish radio links with the MS 50 and manage radio resources. The HLR 80 performs subscriber location registration and serves as a subscriber information database. VLRs 72a and 72b are databases for temporarily storing information about the MS 50 within the service areas of the corresponding MSCs 70a or 70b. If the MS 50 moves into a different service area, the stored information about the MS is deleted.

In the thus-constituted mobile communication system, upon call set-up, a corresponding BTS 62 assigns channels to the MS 50, and communication paths are established between the BTS 62 and a BSC 64, between the BSC 64 and an MSC 70, and between the MSC 70 and an internal network or an external network (e.g., the PSTN). A call is connected via the communication paths. If a call cannot continue due to adverse radio environment conditions or a shadow area, the call is discontinued forcedly.

A caller ID service according to the present invention will be described in detail in the context of the mobile communication system illustrated in FIG 1. Providing picture information (PCID: Picture Caller Identification) according to the present invention is implemented in two steps: (1) registering picture information of a plurality of subscribers beforehand; and (2) displaying the picture of a calling subscriber as caller ID on a called terminal upon generation of a set-up message during a call attempt. The PCID registration is performed according to the procedures illustrated in FIG. 2 and FIG. 3 and the caller ID display is performed according to the procedures illustrated in FIGs. 5 and FIG. 6. In the following description, the MS 50, controlled by the BSC 64a, is designated as a calling terminal, another MS (not shown), controlled by the BSC 64c, is designated as a called terminal, and a service provider preliminarily registers information about a caller identification (CID) and a picture caller identification (PCID) of each subscriber in the HLR 80. It should be noted that while a controller in an MSC stores/reads information in/from the HLR and the VLR as is well known, in the present invention, the HLR and the VLR are assumed to store and read information on their own.

Figure 2:
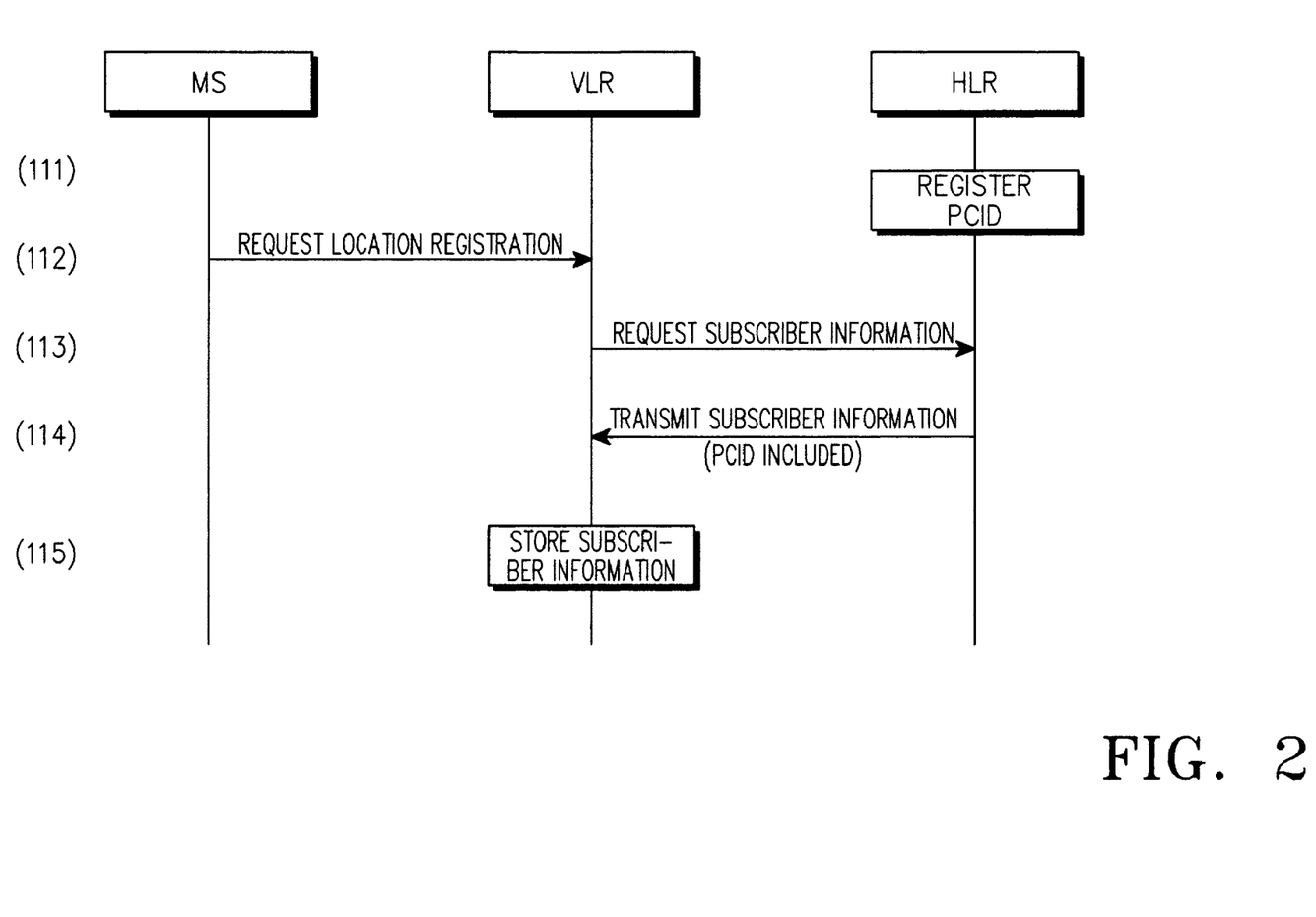
FIG. 2 is a signal flow diagram illustrating an embodiment of a procedure for registering subscriber picture information in a VLR (Visitor Location Register) according to the present invention.

FIG. 2 is a signal flow diagram illustrating an embodiment of a procedure for registering a subscriber PCID in the VLR1 72a according to the present invention. This is the process of sending the PCID of the MS 50 stored in the HLR 80 to the VLR1 72a when the location of the MS 50 is registered in the VLR1 72a.

Referring to FIG. 2, the PCID of each subscriber has been registered in the HLR 80 in step 111. Upon request of location registration from the MS 50 in step 112, the VLR1 72a requests the subscriber information of the MS 50 from the HLR 80 in step 113. In step 114, the HLR 80 sends the subscriber information of the MS 50 to the VLR1 72a. The subscriber information includes the PCID of the MS 50. The VLR1 72a stores the subscriber information of the MS 50 received from the HLR 80 in step 115.

Figure 3:
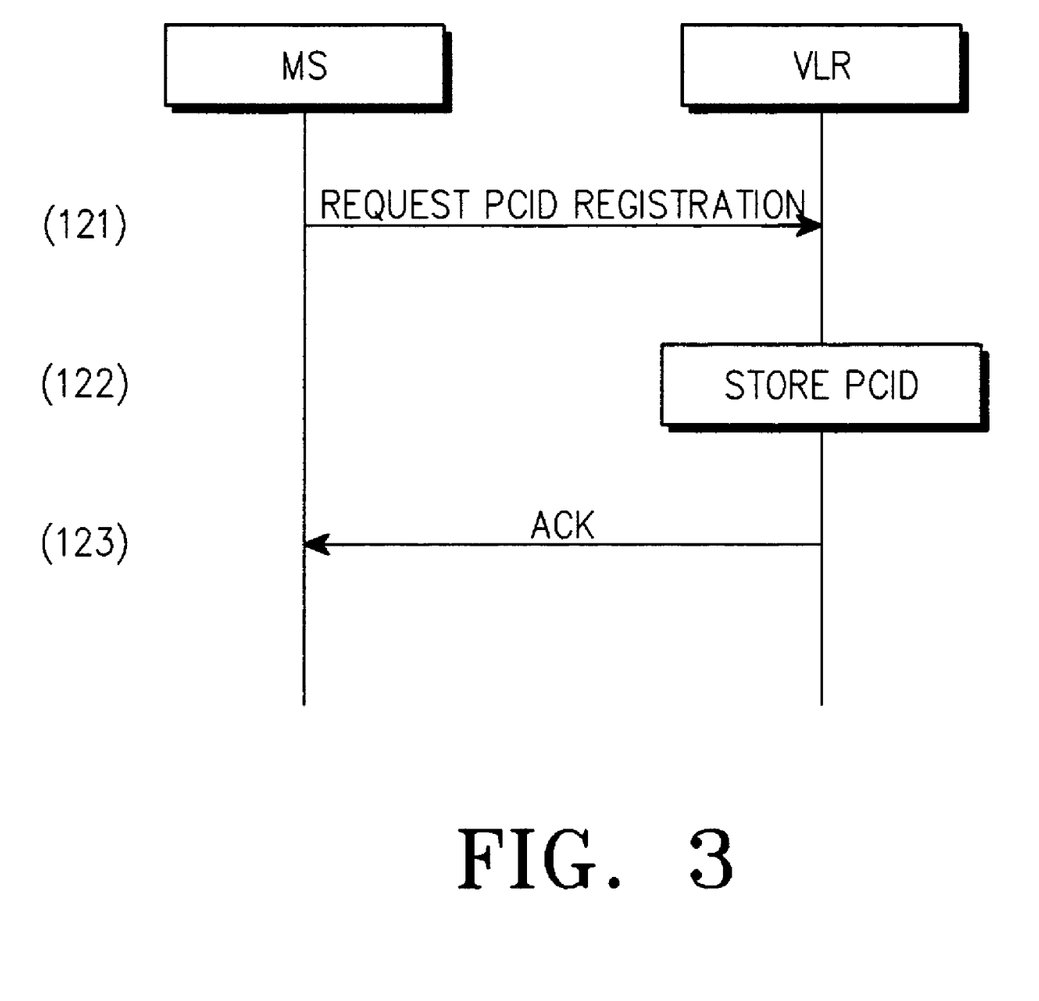
FIG. 3 is a signal flow diagram illustrating another embodiment of the procedure for registering subscriber picture information in a VLR according to the present invention.

FIG. 3 is a signal flow diagram illustrating another embodiment of the procedure for registering a subscriber PCID in the VLR1 72a according to the present invention. This is the process of registering a subscriber PCID in the VLR1 72a in an initial registration procedure or upon user request, instead of preliminarily registering the subscriber PCID in the HLR 80. The user request means a request of PCID registration in the VLR1 72a in a specific terminal mode (e.g., a PCID registration mode).

Referring to FIG. 3, the MS 50 requests its PCID to be registered and transmits the PCID to the VLR1 72a in step 121. The VLR1 72a stores the PCID received from the MS 50 in step 122 and transmits an acknowledgment (Ack) message to the MS 50, notifying that the PCID has been stored, that is, the PCID has been registered successfully in step 123.

Figure 4:
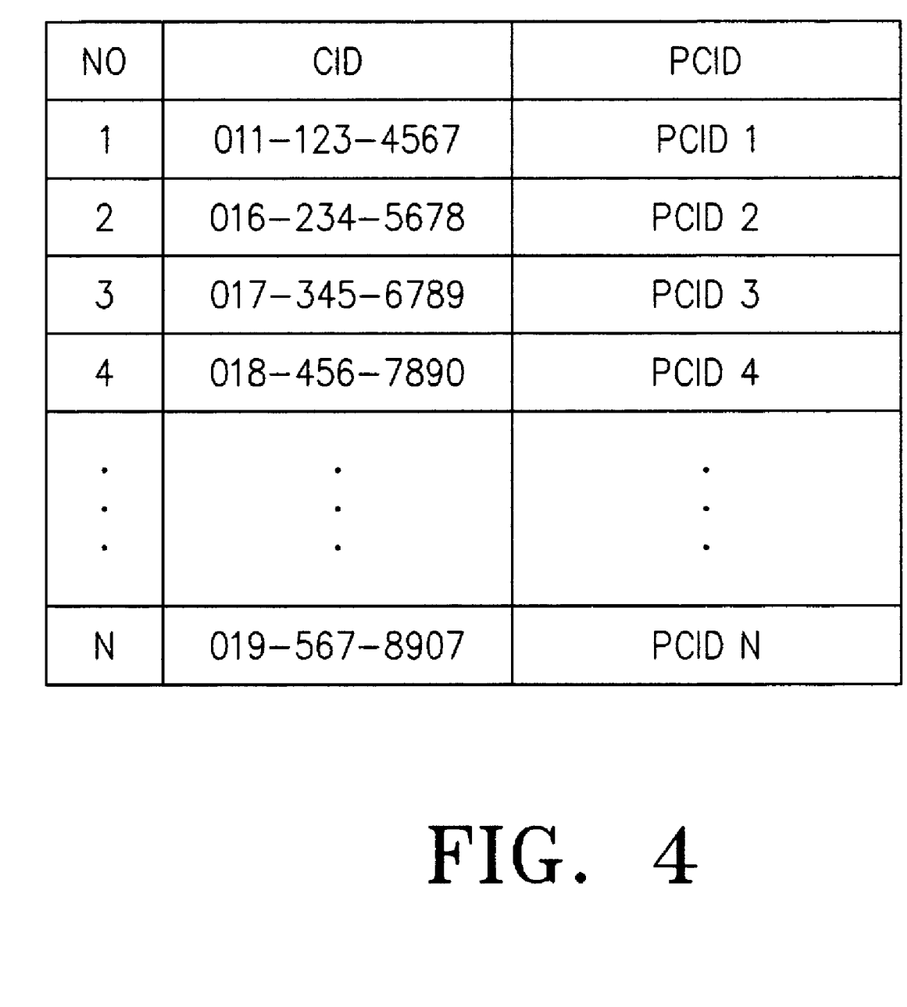
FIG. 4 illustrates a table having subscriber picture information stored in a VLR according to the present invention.

FIG. 4 illustrates an example of a list of PCIDs stored in the VLR1 72a according to the present invention. Referring to FIG. 4, a series of PCIDs of subscribers are stored in the VLR1 72a in relation to their CIDs. A PCID may include image data of a still image, characters, or a moving picture representing a caller.

Figure 5:
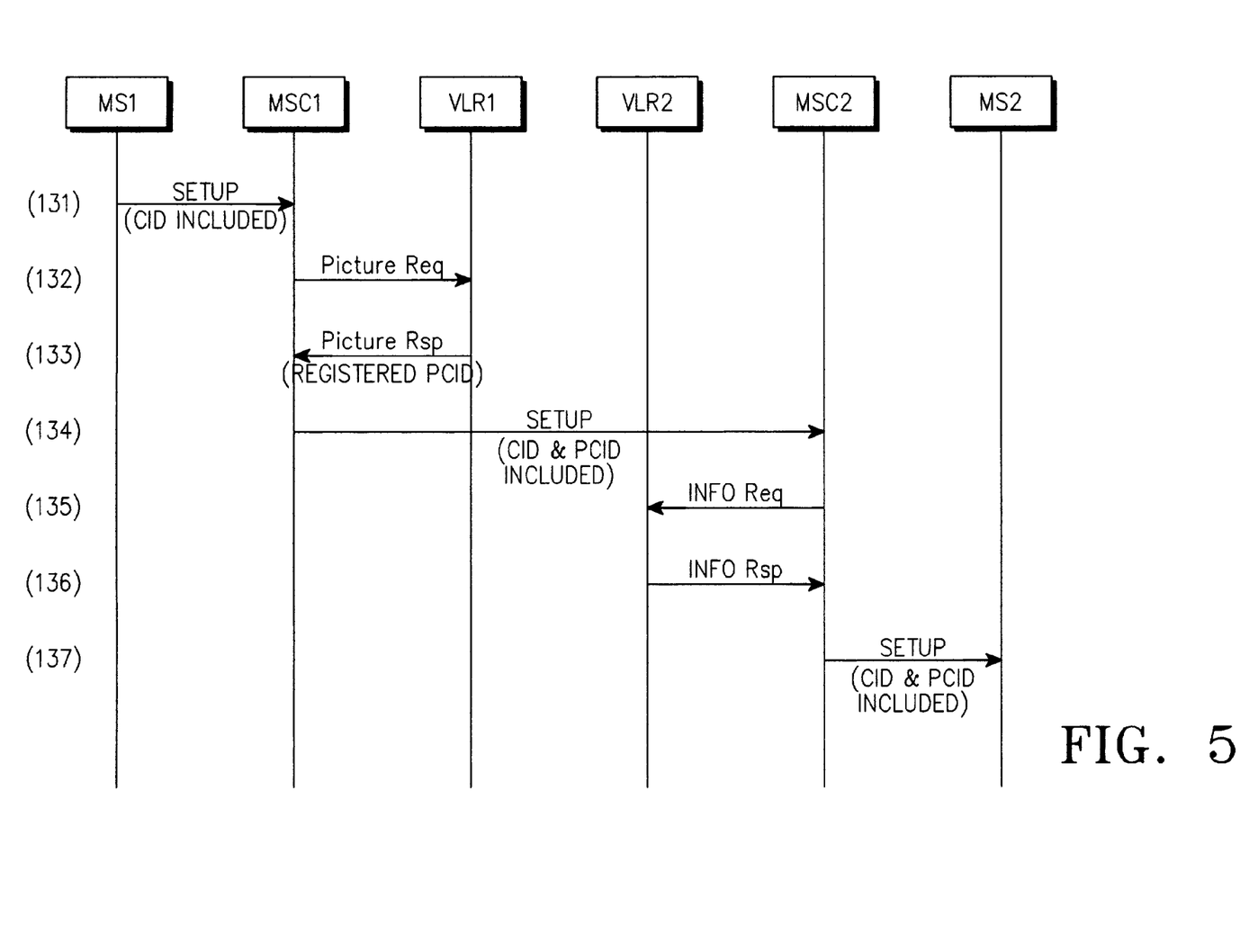
FIG. 5 is a signal flow diagram illustrating an embodiment of a procedure for providing caller ID information according to the present invention.

FIG. 5 is a signal flow diagram illustrating an embodiment of providing a PCID as caller ID according to the present invention. This signal flow occurs in a mobile communication system including a first MS (MS1), a first BS (not shown), and a first MSC (MSC1) on the calling side and a second MS (MS2), a second BS (not shown), and a second MSC (MSC2) on the called side. A first VLR (VLR1) having the CID and PCID of each MS within the coverage area of the first BS is provided to the first MSC. A second VLR (VLR2) having information as to whether each MS within the coverage area of the second BS has subscribed to a PCID service is provided to the second MSC. The PCIDs stored in the first VLR are received from the HLR 80 in response to subscriber's location registration requests as illustrated in FIG. 2 or are received from subscribers together with their PCID registration requests as illustrated in FIG. 3.

Referring to FIG. 5, the first MSC receives a SETUP message from the first BS during a call attempt of the first MS in step 131. The SETUP message contains the CID of the first MS. In step 132, the first MSC transmits a Picture Req message requesting the PCID of the first MS to the first VLR in response to the SETUP message in order to check whether the PCID of the first MS is stored in the first VLR. In the presence of the PCID, the first VLR provides the registered PCID to the first MSC in step 133. The first MSC transmits the PCID of the first MS to the second MSC in step 134 by a SETUP message. The second MSC checks whether the received SETUP message contains the PCID. If it does, the second MSC transmits an INFO Req message to the second VLR to determine whether the called subscriber (i.e., the second MS) has subscribed to the PCID service in step 135. If the second MS has subscribed to the PCID service, the second VLR transmits an INFO Rsp message to the second MSC in step 136. The second MSC transmits a SETUP message containing the CID and the PCID of the first MS to the second MS via the second BS in response to the INFO Rsp message in step 137.

Here, the SETUP message containing the CID and the PCID of the first MS is transmitted only after the second MSC determines that the second MS has the ability to process picture information. The ability of an MS to process picture information can be given in a fixed way or in a dynamic way. For example, an MS equipped with an SIM (Subscriber Identifier Module) card including subscriber information (e.g., a GSM terminal) can process picture information only if its subscriber has subscribed to the PCID service. Then, the CID and the PCID of the first MS are displayed on the second MS.

Figure 6:
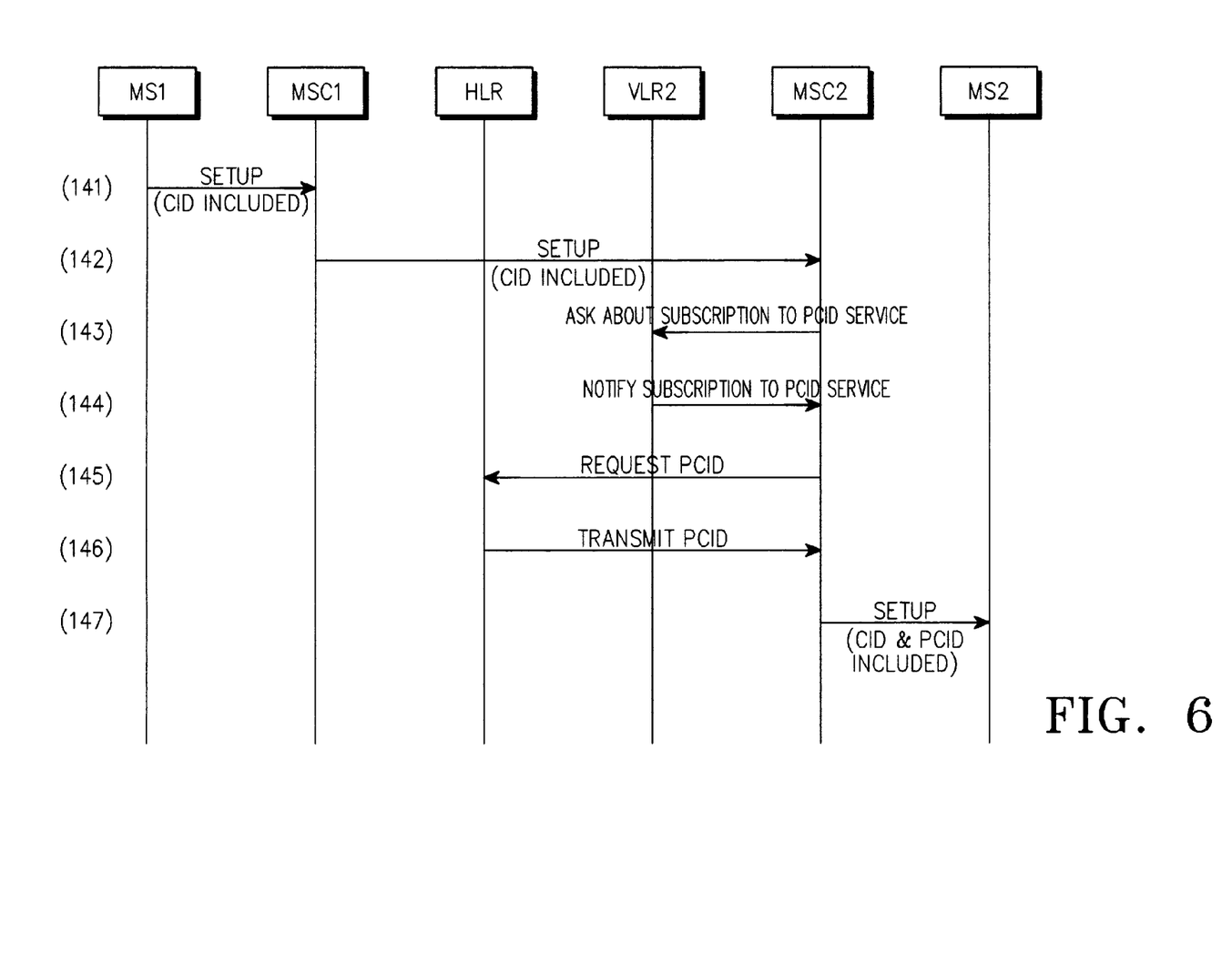
FIG. 6 is a signal flow diagram illustrating another embodiment of the procedure for providing caller ID information according to the present invention.

FIG. 6 is a signal flow diagram illustrating another embodiment of the procedure for providing a PCID as caller ID according to the present invention. This signal flow occurs in a mobile communication system including an HLR, a first MS (MS1), a first BS (not shown), and a first MSC (MSC1) on the calling side, and a second MS (MS2), a second BS (not shown), and a second MSC (MSC2) on the called side. The HLR stores the CID and PCID of each MS within the coverage area of the first BS. A second VLR (VLR2) having information as to whether each MS within the coverage area of the second BS has subscribed to the PCID service is provided to the second MSC.

Referring to FIG. 6, the first MSC receives a first SETUP message from the first BS during a call attempt of the first MS in step 141. The SETUP message contains the CID of the first MS. In step 142, the first MSC transmits a second SETUP message containing the CID of the first MS to the second MSC, in response to the first SETUP message. In response to the second SETUP message, the second MSC checks whether the second MS has subscribed to the PCID service through the second VLR in steps 143 and 144. That is, the second MSC asks the second VLR whether the second MS has subscribed to the PCID service in step 143 and the second VLR gives an answer to the question to the second MSC in step 144. If the second MS has subscribed to the PCID service, the second MSC requests the PCID of the first MS from the HLR. In response to the PCID request, the second MSC receives the PCID of the first MS from the HLR in step 146 and transmits the CID and PCID of the first MS to the second MS via the second BS in step 147. Then, the CID and the PCID of the first MS are displayed on the second MS.

Figure 7:
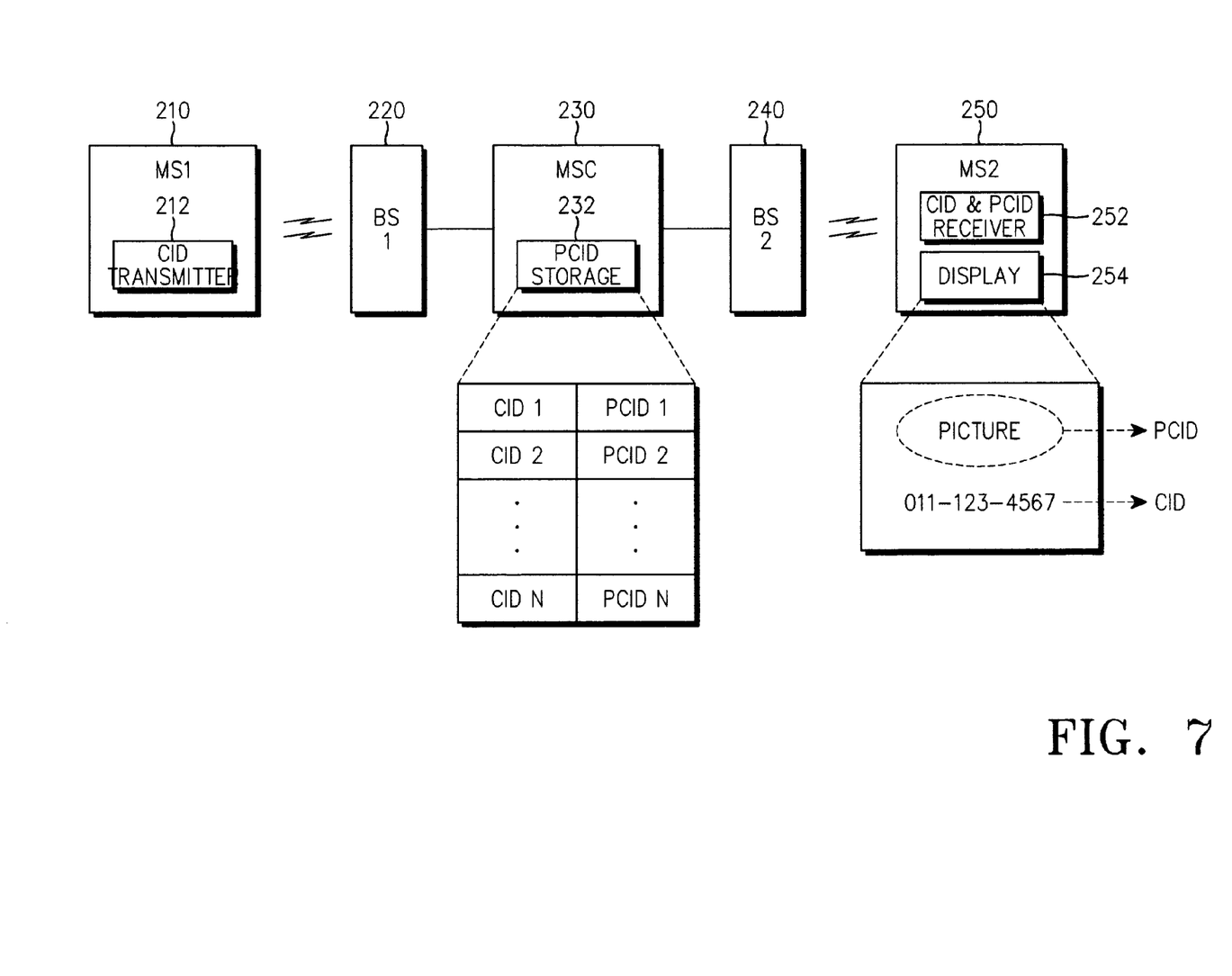
FIG. 7 illustrates an embodiment of a mobile communication system for providing caller ID information according to the present invention.

FIG. 7 illustrates an embodiment of a mobile communication system for providing a PCID as caller ID according to the present invention. Referring to FIG. 7, a first MS (MS1) 210 transmits a SETUP message at a call attempt. The first MS 210 has a CID transmitter 212 for transmitting its CID. The SETUP message contains the CID of the first MS 210. A first BS (BS1) 220, an MSC 230, and a second BS (BS2) 240 form an exchange. The first BS 220 is connected to the first MS 210 wirelessly and connected to the MSC 230 by a cable. The second BS 240 is connected to the MSC 230 by a cable and connected to the second MS 240 wirelessly. The MSC 230 includes a PCID storage (location register) 232 for storing the PCID of each MS and controls signal transmission/reception between the first and second MSs 210 and 250 via the first and second BSs 220 and 240. The PCID storage 232 can be an HLR or a VLR. A PCID stored in the PCID storage 232 can be the image data of a still image, characters, and a moving picture representing a corresponding MS. If the PCID storage 232 is a VLR, the PCID of the first MS is received from the HLR of the MSC 230 and stored in the VLR upon request of location registration from the first MS 210. The MSC 230 checks whether the PCID of the first MS is in the PCID storage 232 in response to the SETUP message received from the first MS 210 via the first BS 220. Then, the MSC 230 transmits the PCID of the first MS 210 to the second MS 250 via the second BS 240. The second MS 250 is comprised of a receiver 252 for receiving CID and PCID information from the MSC 230 via the second BS 240 and a display 254. The CID and PCID of the first MS 210 are displayed on the display 254. For example, the PCID of the first MS is displayed in the upper part of the display 254 and the CID of the first MS, for example, "011-123-4567" is displayed on the lower part of the display 254. Thus, the subscriber of the second MS 250 can identify the caller more accurately.

Figure 8:
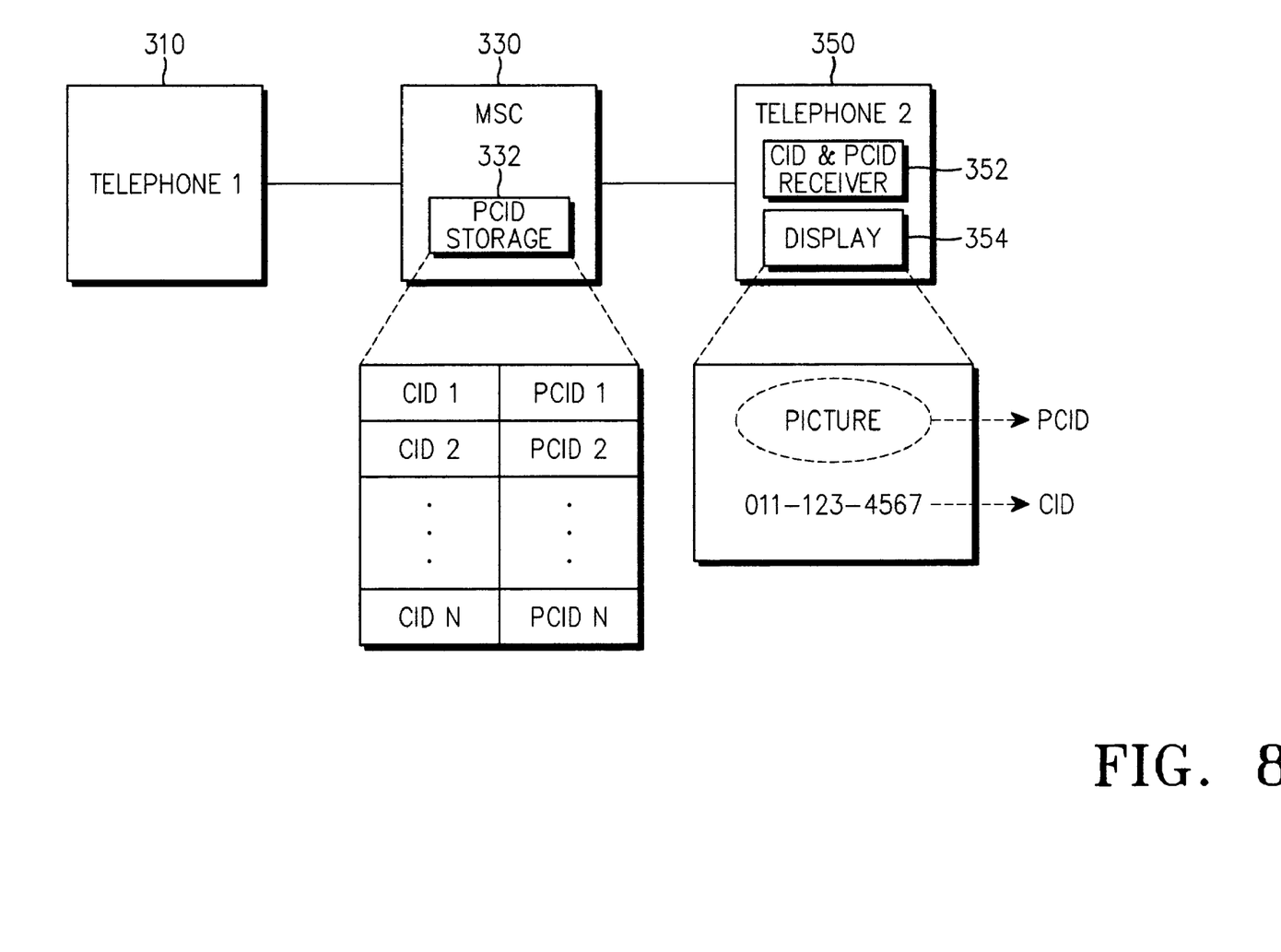
FIG. 8 illustrates an embodiment of a wired communication system for providing caller ID information according to the present invention.

While the above description has been made in the context of a mobile communication system, the present invention is also applicable to a wired communication system that enables communication between wired terminals capable of displaying picture information as illustrated in FIG. 8.

FIG. 8 is a block diagram illustrating an embodiment of a wired communication system for providing the PCID of a caller as caller ID information according to the present invention. Referring to FIG. 8, a first telephone (telephone 1) 310 is connected to an MSC 330 by a cable. The MSC 330 has a PCID storage 332 that stores the CID and PCID of each telephone. The MSC 330 can be a central office exchange or a private branch exchange (PBX). The PCID information stored in the picture information storage 332 includes the image data of a still image, a character, or a moving picture representing each telephone. The MSC 330 checks whether the CID and PCID of the first telephone 310 are present in the PCID storage 332 in response to a SETUP message received from the first telephone 310. If the CID and the PCID are in the PCID storage 332, the MSC 330 transmits the CID and the PCID of the first telephone 310 to a second telephone (telephone 2) 350. The second telephone 350 is provided with a receiver 352 for receiving the CID and PCID from the MSC 330 and a display 354. The CID and PCID of the first telephone 310 received at the receiver 352 are displayed as caller ID information on the display 354. For example, the PCID of the first MS 310 is displayed in the upper part of the display 354 and the CID of the first telephone 310 (e.g., phone number "011-123-4567"), on the lower part of the display 354. Thus, the subscriber of the second telephone 350 can identify the caller more accurately.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of providing picture caller identification (PCID) to a called party in a mobile communication system, the method comprising the steps of:

storing a PCID of each mobile station (MS) within a coverage area of a first base station (BS) in a first visitor location register (VLR) of a first mobile switching center (MSC);

storing information as to whether each MS within a coverage area of a second BS has subscribed to a PCID service in a second VLR of a second MSC;

receiving a SETUP message including character caller identification (CID) from a first MS via the first BS during a call attempt by the first MSC;

checking whether the PCID of the first MS is stored in the first VLR by the first MSC in response to the SETUP message;

transmitting the CID and the PCID of the first MS to the second MSC by the first MSC if the PCID of the first MS is stored in the first VLR;

checking whether a second MS has subscribed to the PCID service by the second MSC;

transmitting the CID and the PCID of the first MS to the second MS by the second MSC, if the second MS has subscribed to the PCID service; and displaying the CID and the PCID of the first MS on the second MS.

2. The method of claim 1, further comprising the step of checking whether the second MS is capable of processing PCID by the second MSC, wherein if the second MS is capable of processing the PCID, the second MSC transmits the CID and the PCID of the first MS to the second MS via the second BS.

3. The method of claim 1, wherein the PCID is image data of a still image representing a subscriber of the first MS.

4. The method of claim 1, wherein the PCID is image data of a character representing a subscriber of the first MS.

5. The method of claim 1, wherein the PCID is image data of a moving picture representing a subscriber of the first MS.

6. The method of claim 1, wherein upon request of location registration from the first MS, the PCID is received from a home location register (HLR) and stored in the first VLR.

7. A method of providing picture caller identification (PCID) to a called party in a mobile communication system, the method comprising the steps of:
- storing a PCID of each MS within a coverage area of a first base station (BS) in an HLR (Home Location Register);
- storing information as to whether each MS within a coverage area of a second BS has subscribed to a PCID service in a VLR (Visitor Location Register) of a second mobile switching center (MSC);
- receiving a first SETUP message including character caller indentification (CID) from a first MS via the first BS during a call attempt by a first MSC;
- transmitting a second SETUP message including the CID of the first MS to the second MSC by the first MSC in response to the first SETUP message;
- checking whether a second MS has subscribed to a PCID service by the second MSC in response to the second SETUP message;
- requesting the PCID of the first MS from the HLR by the second MSC if the second MS has subscribed to the PCID service;
- receiving the PCID of the first MS from the HLR by the second MSC; and
- (8) transmitting the CID and the PCID of the first MS to the second MS via the second BS by the second MSC in order to display the CID and the PCID of the first MS on a display of the second MS.

8. The method of claim 7, wherein the PCID is image data of a still image representing a subscriber of the first MS.

9. The method of claim 7, wherein the PCID is image data of a character representing a subscriber of the first MS.

10. The method of claim 7, wherein the PCID is image data of a moving picture representing a subscriber of the first MS.

* * * * *